United States Patent [19]

Kohira et al.

[11] 4,087,674

[45] May 2, 1978

[54] STEEL WIRE FOR GAS SHIELDED WELDING

[75] Inventors: Kazumaru Kohira, Sama; Shiro Aoki, Machida; Taizi Nagatani, Sagamihara, all of Japan

[73] Assignee: Nippon Steel Corporation, Tokyo, Japan

[21] Appl. No.: 766,740

[22] Filed: Feb. 8, 1977

Related U.S. Application Data

[63] Continuation-in-part of Ser. No. 607,687, Aug. 25, 1975, abandoned.

[30] Foreign Application Priority Data

Aug. 26, 1974 Japan .................................. 49-97731

[51] Int. Cl.² ..................... C22C 38/02; C22C 38/04; B23K 35/22
[52] U.S. Cl. .............................. 219/146.1; 75/123 N; 75/123 R; 148/36
[58] Field of Search ......... 219/145; 75/123 N, 123 R; 148/36, 12 B; 29/193

[56] References Cited

U.S. PATENT DOCUMENTS

| | | | |
|---|---|---|---|
| 2,825,669 | 3/1958 | Herzog | 148/36 |
| 2,907,864 | 10/1959 | Rothschild et al. | 75/123 N |
| 3,030,496 | 4/1962 | Cotter et al. | 75/123 N |
| 3,218,432 | 11/1965 | Peck | 75/123 R |
| 3,496,034 | 2/1970 | Alger et al. | 148/31 |
| 3,602,689 | 8/1971 | Heuschkel | 75/128 V |
| 3,933,441 | 1/1976 | Massoubre | 75/123 N |

*Primary Examiner*—Arthur J. Steiner
*Attorney, Agent, or Firm*—Toren, McGeady and Stanger

[57] ABSTRACT

A steel wire for short circuiting gas shielded transfer welding which comprises 0.5 to 1.0% of Si, 1.0 to 2.0% of Mn, not more than 0.015% of P, S and N, respectively, 0.07 to 0.20% of C and not more than 0.020% of total oxygen, the total oxygen being the sum of the oxygen within the wire plus the oxygen adhered to the surface of the wire being more than about 0.004%.

3 Claims, 13 Drawing Figures

STEEL WIRE FOR GAS SHIELDED WELDING

CROSS-REFERENCE TO RELATED APPLICATIONS

This application is a continuation-in-part of copending application Ser. No 607,687, filed Aug. 25, 1975 now abandoned.

BACKGROUND OF THE INVENTION

1. Field of the Invention

The present invention relates to a steel wire for gas shielded welding, more particularly a steel wire useful for performing all-position welding of a large gauge steel plate mainly under short circuiting transfer conditions.

2. Description of the Prior Art

Generally, the short circulating transfer type welding is easily performed in all welding positions, and the penetration obtained by the welding is shallow and good bead appearance can be obtained. Thus, this type of welding has been widely used for welding a thin steel sheet.

In recent years, in order to enhance welding efficiency, the tendency towards automatic or semi-automatic welding operations by applying the short circuiting transfer welding method to the multi-layer welding of relatively thick steel plate which hitherto had been welded manually, has increased.

However, when the conventional short circuiting transfer welding method is applied to the multi-layer welding of a thick plate, only a shallow penetration is obtained, and, as a result, satisfactory fusion is not attained and slag inclusion is most likely to take place. Also, in the case of a steel pipe, good back bead formation cannot be obtained when one side back bead is required in the first layer.

In the short circuiting transfer welding, the length of the arc between the electrode wire and the base metal to be welded is controlled by adjustment of the arc voltage, and arc generation short circuiting and transfer of droplet are repeated more than ten times per second. Thus, this welding method has certain periods in which no arc is generated, and the frequency of the droplet transfer is high so that the welding can be easily performed in all positions, overheating of the base metal can be prevented, and the penetration is shallow. The fact that the penetration is shallow is normally advantageous because no fusion loss is caused. However, when the short circuiting transfer welding is applied to a thick plate, it does not give enough heat for melting the base metal, and the melting power of the arc when it is generated is inferior so that defects, such as, incomplete fusion and slag inclusion, result.

Further, in a gas shielded welding, a power source of D.C. constant voltage characteristics is used and a control system by constant speed feeding is adopted.

According to the D.C. constant voltage power source system, if the arc voltage which should be constant increases only slightly due to the surface irregularity and other factors, the welding current instantaneously decreases remarkably when the arc voltage increases so that the fusion rate of the wire is retarded and the space between the base metal and the wire is shortened and the arc voltage returns to its original value.

On the contrary, when the arc voltage gets lower than the constant value, the welding current increases sharply and the fusion rate of the wire increases so that the space between the base metal and the wire is elongated and thus the arc voltage returns to its original value.

Therefore, in the gas shielded welding which is commonly used, it is important to maintain the arc length constant utilizing the self-control ability of the constant voltage power source.

Based on the above principle, it is necessary that the fusion rate of the wire changes corresponding to delicate variations by the welding current depending on the change of the arc length. For this purpose, any abrupt change in the fusion of the wire should be avoided and the fusion should proceed smoothly against any current change.

However, conventional welding wires have the defect that arcs produced by these wires are so unstable that the arcs can not be satisfactorily controlled by the inherent self-control of the arc voltage, and the wires get into the molten pond thereby causing the so-called stick phenomenon, thus resulting in vigorous spattering and deterioration of the bead shape as well as unsatisfactory fusion of the wire.

Under the current tendencies toward the automatization and mechanization of the welding operation, development of welding wires has been strongly demanded in many industrial fields, such as, ship-building, car-manufacturing and building industries.

SUMMARY OF THE INVENTION

Therefore, the object of the present invention is to provide welding wires which have overcome the above-mentioned defects of the conventional wires, and are very useful for a short circuiting transfer welding of thick steel plate.

The features of the present invention lie in that the composition of the wire is limited to 0.5 to 1.0% Si, 1.0–2.0% Mn, not more than 0.015% P, S and N, respectively, 0.07 to 0.20% C, and not more than 0.020% of total oxygen, the total oxygen being the sum of the oxygen within the wire, plus the oxygen adhered to the surface of the wire and the amount of oxygen within the wire being more than 0.004%, and further lie in that the distribution index of the non-metallic inclusions is not more than 1.0 according to the following formula:

$$\text{Distribution Index} = \frac{\left(\begin{array}{c}\text{Number of}\\\text{inclusions}\\\text{over 5 } \mu \text{ to 10 } \mu\end{array}\right) + \left(\begin{array}{c}\text{Number of}\\\text{inclusions}\\\text{over 10 } \mu \text{ to 20 } \mu\end{array}\right) \times 5 + \left(\begin{array}{c}\text{Number of}\\\text{inclusions} \times 10\\\text{over 20 } \mu\end{array}\right)}{\text{Number of Measured View Fields}}$$

*The number of inclusions is the number in the longitudinal cross section of the wire. The measured dimension is 60 mm² or more in the longitudinal cross section along the center portion of the wire and the length of inclusion is measured by sizes on the whole measured surface.

DESCRIPTION OF THE PREFERRED EMBODIMENT

The reasons for the limitation of the wire composition and the distribution index of inclusions according to the present invention are described hereinbelow.

From the results of gas shielded short circuiting welding tests using carbonic acid gas, argon gas, etc., it has been found that a steel wire containing less than 0.5% Si and less than 1% Mn, both being outside the scope of the present invention, shows remarkable flowing of the molten metal and thus deep penetration can not be obtained, and blow holes occur depending on the contents of Si and Mn.

On the contrary, a welding wire containing more than 1% Si and more than 2% Mn, shows increased viscosity of the molten metal and poor beads having an extreme convex shape, and also exhibit embrittlement of the weld metal.

Therefore, the ranges of Si and Mn should be 0.5 to 1.0% Si, and 1.0 to 2.0% Mn. Along with the adjustment of Si and Mn, it is necessary to adjust the contents of P, S and N to not more than 0.015% for each. When one or more of these three elements is more than 0.015%, flowability of the molten metal and the arc condition changes so that deep penetration can not be obtained.

The present inventors have found from further experiments that when the carbon content and the total oxygen content are adjusted to not less than 0.07%, and not more than 0.020%, respectively, in addition to the adjustments of Si, Mn, P, S and N as above, the penetration and welding operation efficiency in the short circuiting transfer welding are remarkably improved. The total oxygen content used herein means the value obtained by extraction analysis of the electrode wire as received using the vacuum fusion method, and thus includes the oxygen content in the wire and the oxygen adhering on the wire surface in the form of rust.

In order to confirm the effects of carbon and oxygen, various wires were prepared with different carbon and oxygen contents, as shown in Table 1 and short circuiting welding was performed using these wires and the penetration depth was measured. The results are shown in FIG. 1.

Figure 1:
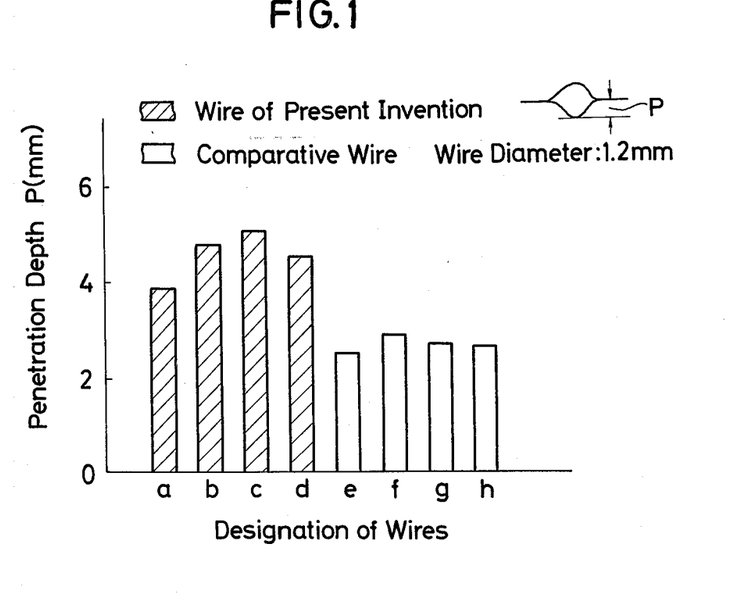
FIG. 1 is a graph showing the penetration depth in short circuiting transfer welding using the welding wires according to the present invention and comparative welding wires.

As clearly understood from FIG. 1, the wires *a* to *d* of the present invention show a deeper penetration than that obtained by the comparative wires *e* to *h*. Thus, by adjusting the carbon content to not less than 0.07% and the total oxygen content to not more than 0.020%, a deep penetration can be obtained.

Figure 2:
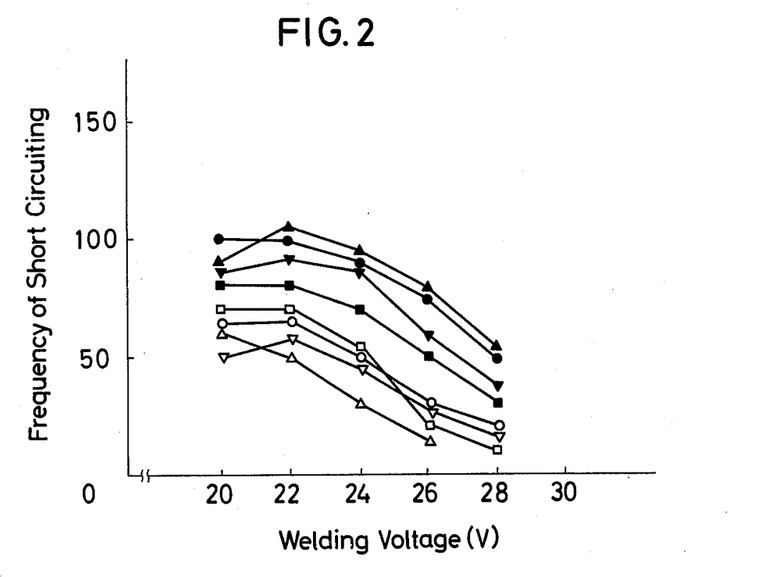
FIG. 2 is a graph showing the relation between the welding voltage and the frequency of short circuiting.

FIG. 2 shows the results of investigations on the changes of the frequency of short circuiting against the welding voltage in the short circuiting transfer welding using the wires shown in Table 1.

The wires of the present invention show a high frequency of short circuiting and maintain a high level on a higher voltage side as compared with the comparative wires. This indicates that better welding operation efficiency can be assured by the wires of the present invention.

Also from FIG. 1 and FIG. 2, it is understood that not less than 0.07% of carbon and not more than 0.02% of total oxygen, particularly, not less than 0.10% of carbon and not more than 0.015% of total oxygen are advantageous for the penetration depth and the welding operation efficiency.

Of the carbon and oxygen, not less than 0.07% of carbon has been found to be useful, while the upper limit of the carbon content is defined in view of the mechanical properties of the weld metal. Thus, as the carbon content increases, the weld metal becomes harder and brittle and loses toughness. However, it has been confirmed that no practical problem is caused so long as the carbon content is maintained to 0.20% or less.

Therefore, the carbon content is limited to 0.07 to 0.20% in the present invention.

Regarding the oxygen content, the total oxygen content used herein includes oxygen contained in the adhesions on the wire, such as, rust on the wire surface and beneath the plating coat and lubricant, sometimes referred to herein as "oxygen adhered onto the wire", in addition to the oxygen contained in the wire itself.

For determining the effects of oxygen on the penetration depth and the welding operation efficiency, it is necessary to clarify the respective effects of the oxygen content in the wire itself, which varies depending on the steel making methods, and the oxygen deriving from the adhesions on the wire which adhere to the wire during wire drawing, acid pickling and annealing steps after the hot rolling.

For this purpose, steel was prepared in a convertor, and some of it was subjected to a deoxidation adjustment at the tapping to adjust the oxygen content. Thereby three grades of steel having different oxygen contents were prepared: (1) an oxygen content not more than 0.005% (average: 0.004%), (2) an oxygen content between 0.007 and 0.011% (average: 0.009%) and (3) an oxygen content between 0.012 and 0.015% (average: 0.013%). The contents of the other components were maintained about same, the carbon content fell within the range from 0.11 to 0.13%, the silicon content fell within the range from 0.75 to 0.80%, the manganese content fell within the range from 1.45 to 1.55%, the phosphorus content fell within the range from 0.011 to 0.013%, the sulfur content fell within the range from 0.008 to 0.010% and the nitrogen content fell within the range from 0.005 to 0.007%.

Then the above three grades of steel were drawn, acid-pickled, annealed and plated with different conditions to produce wires having different amounts of adhesion oxygen. The penetration depth obtained by using these wires was investigated and the results are shown in FIG. 3.

Figure 3:
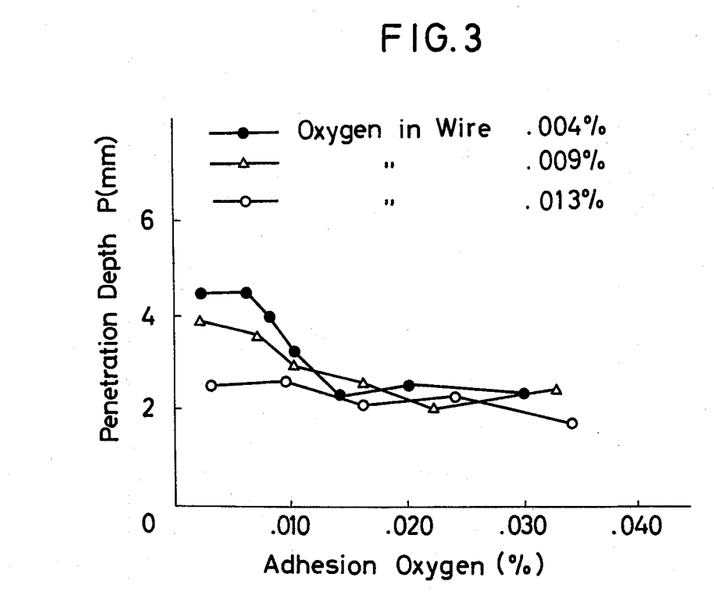
FIG. 3 is a graph showing the relation between the oxygen amount and the penetration depth in short circuiting transfer welding.

It is understood from FIG. 3 that as the amount of adhesion oxygen increases the penetration becomes shallower, and it is necessary to limit the amount of adhesion oxygen to not more than 0.01%. Also it is necessary to maintain the oxygen content in the wire itself low, and if the oxygen content in the wire is too high, a desirable result can not be obtained even when the adhesion oxygen is maintained to less than 0.010%. Therefore, it is very effective to lower the oxygen content in the wire for a deep penetration.

Figure 4:
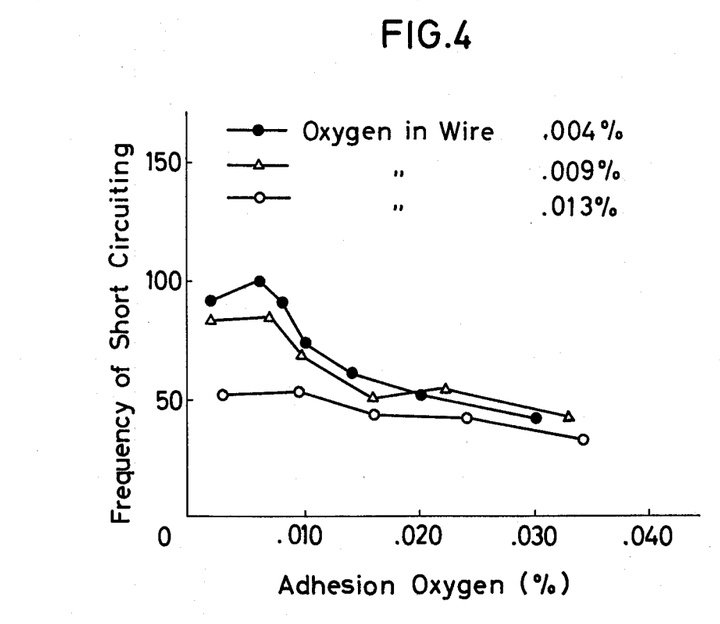
FIG. 4 is a graph showing the relation between the oxygen amount and the frequency of short circuiting.

FIG. 4 shows the results of investigation on the frequency of short circuiting, from which it is understood that the lowering of the frequency can be prevented if the oxygen content in the wire is maintained low and the adhesion oxygen is maintained at not more than 0.010%.

From the above results, it is understood that the oxygen content in the wire should be not more than 0.01% and the adhesion oxygen should be not more than 0.01% and thus the total oxygen should be not more than 0.020%.

Further, as mentioned hereinbefore, the fusion rate of the wire used in a gas shielded welding must be variable corresponding to the changes of the arc length. However, an unstable arc phenomenon is often observed which can not be compensated for under practical welding conditions. This phenomenon is related partially to the feeding of the wire, but it is considered to be more related to the nature of the wire. Therefore, the present inventors investigated the transfer of droplets during the welding by a high-speed photographing in order to clarify the essence of the problem.

The results have revealed that a phenomenon is caused in which the droplets show abnormal movement and abnormal expansion, and its frequency is related to the size and distribution of the non-metallic inclusions in the wire.

In order to determine the effects of the wire composition and the distribution of the non-metallic inclusions, various wires $a$ to $d$ as shown in Table 2 were prepared from steel made by the air melting method and conventional ingot-making method, and wires $e$ to $h$ were prepared from steel made by vacuum degassing or vacuum casting. The distribution index of non-metallic inclusions shown in the table was calculated from the measurements of 600 view fields by using an optional device (a small computer system) for evaluation of the non-metallic inclusions. Statistical investigation results have revealed that the wire index can be represented with accuracy of $\pm 0.02$ when 10 m of wire is cut at a 1 m length and observations are collected from each of 60 view fields. The terms "$\alpha, \beta, T$" in the table represent the test wires for welding a high tensile strength steel of 60 kg/mm$^2$ grade.

Figure 8:
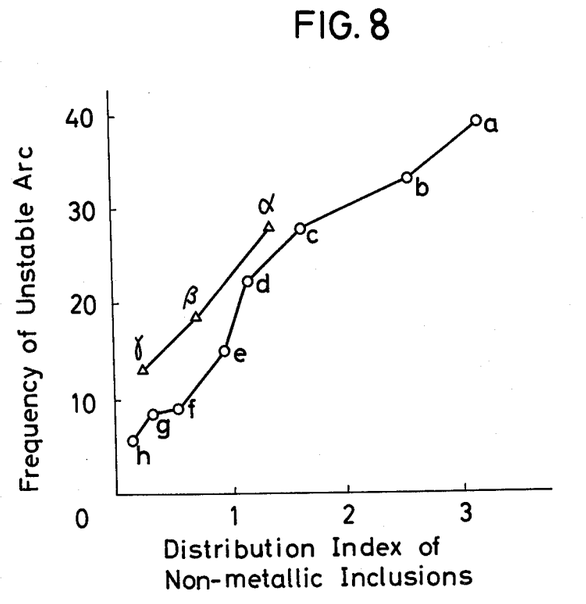
FIG. 8 is a graph showing the relation between the distribution index of non-metallic inclusions and the frequency of the unstable arc.

FIG. 8 shows the relation between the frequency of unstable arcs and the distribution index of non-metallic inclusions during the welding of a fixed tube of 12.7 mm thickness using the wires shown in Table 2 (1.2 mm wire diameter, 180 to 220A, 18.5 to 19V). The "unstable arc" means that condition in which the arc is in disorder continuously for 0.5 second or longer, and the graph shows also how many times the unstable arc occurred during the entire process of the welding.

Figure 9:
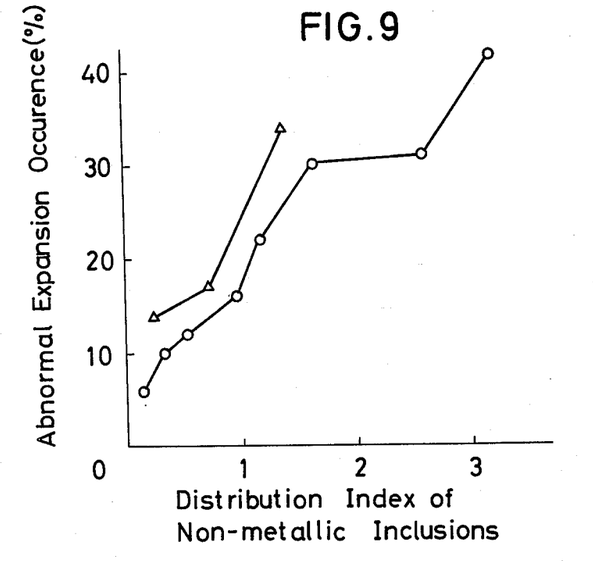
FIG. 9 is a graph showing the distribution index of non-metallic inclusions and the frequency of the abnormal expansion of droplets.

FIG. 9 shows the relation between the frequency of the abnormal expansion phenomenon and the distribution index. The abnormal expansion phenomenon is considered due to $H_2$, CO and other gases which are present around the non-metallic inclusions in the droplets as revealed from the analysis of the transfer of droplets by photographing the transfer at a high speed with a vertical-downward position. The welding conditions in FIG. 9 are: 1.2 mm wire diameter; 150A, 18V and 30 cm/min feed.

As clearly understood from FIG. 8 and FIG. 9, as the index increases, the frequency of the unstable arc increases. Also it is clear that when the index exceeds 1.0, the frequency of the unstable arc and the occurrence of the abnormal expansion increases sharply.

Therefore, in order to perform the welding with a stable arc, it is necessary that the distribution index of non-metallic inclusions in the wire is not more than 1.0.

Further, in order to maintain the index at not more than 1.0, it is clear from Table 2 that P and S should be not more than 0.015%, respectively, and the oxygen should be not more than 0.020%.

As N fixes the non-metallic inclusions and tends to form nitrides, it is desirable that the N content is maintained at not more than 0.015%.

Figure 10:
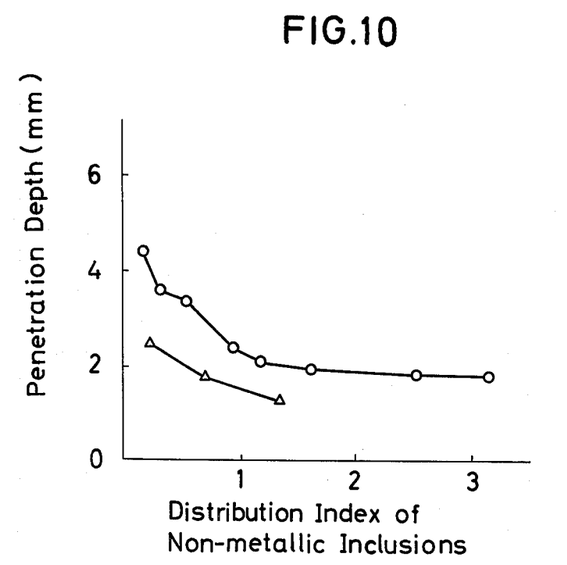
FIG. 10 is a graph showing the relation between the distribution index and the penetration depth.

FIG. 10 shows the effects of the distribution index of non-metallic inclusions on the penetration depth, and indicates that a deeper penetration is obtained as the index decreases. The welding conditions in FIG. 10 are: 1.2 mm wire diameter; 150A; 18V; and 30 cm/min feed. The effects are closely related to the transfer of the droplets, and the abnormal movement of the droplets weakens the concentration of the arc and affects the penetration. In this point also, good results can be obtained by maintaining the distribution index at 1.0 or less.

Figure 11:
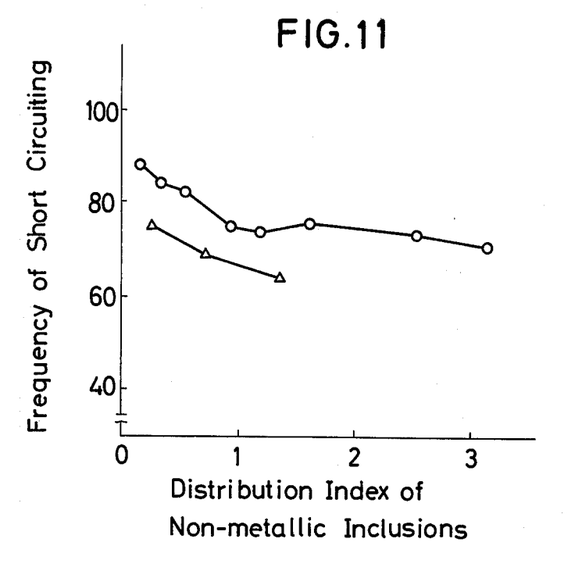
FIG. 11 is a graph showing the relation between the distribution index and the frequency of short circuiting.

FIG. 11 shows the relation between the frequency of short circuiting and the distribution index of non-metallic inclusions. In this point also, the frequency of the abnormal expansion of droplets during their transfer has a strong relationship to the distribution index, and as the distribution index becomes smaller and the distribution is more uniform, the frequency of short circuiting increases and the arc becomes more stable. The welding conditions in FIG. 11 are: 1.2 mm wire diameter; 150A and 18V. It is noted that the relationships for FIGS. 8, 9, 10 and 11 are for the compositions shown in Table 2.

In the foregoing descriptions, the lower limits of P, S and N have not been defined. In the present invention, there is no specific limit on these elements and they may be present as unavoidable impurities. However, the bead shape is an important factor in weldability and when the oxygen content is extremely low, the bead becomes convex. This is particularly so in the case of the all-position welding of steel pipe. Thus, we have found that the oxygen in the wire must be more than 0.004%.

One example of welding using the wire according to the present invention will be described hereinbelow.

Figure 12:
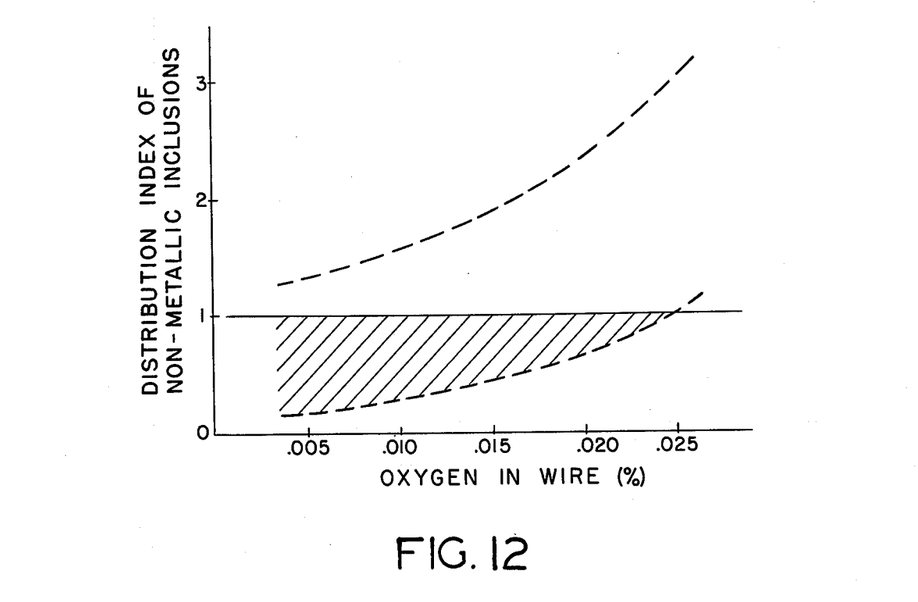
FIG. 12 is a graph showing the relation between the distribution index and the oxygen in the wire.

FIG. 12 is a graph of the relationship between the oxygen content in the wire and the distribution index of non-metallic inclusions when the welding wire is produced by an ordinary process. As shown, the index increases and fluctuates more as the oxygen content in the wire increases. Therefore, as described hereinbefore, in order to obtain a wire having a distribution index not higher than 1 (the slant line portion of FIG. 12) required by the welding operation, it is necessary to prevent development of large non-metallic inclusions and disperse finely the inclusions by a special method, such as by increasing the solidification speed during the ingot or slab making process. Naturally, if the oxygen content in the wire is lowered beforehand, it is easy to obtain a wire having a distribution index not higher than 1.

Figure 13:
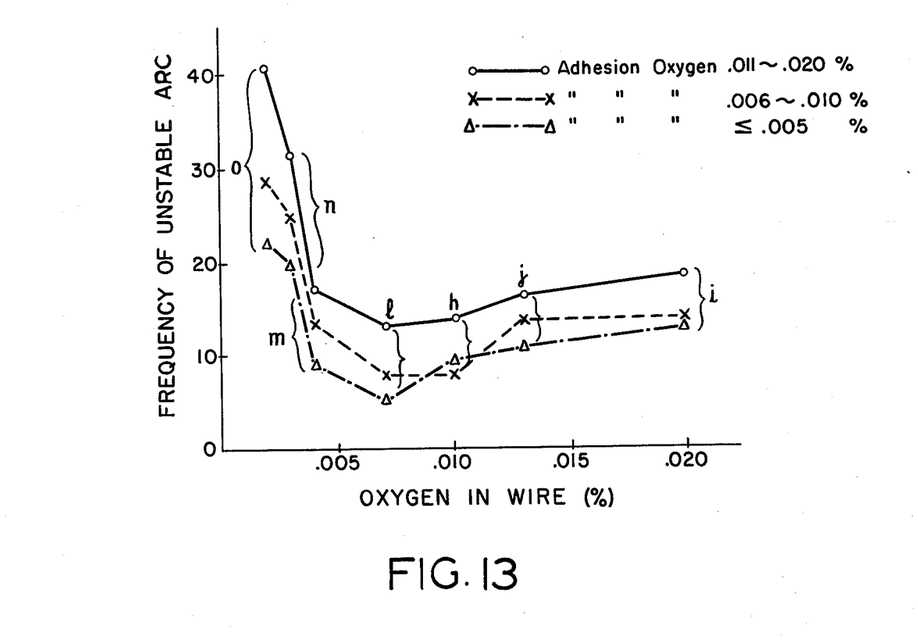
FIG. 13 is a graph showing the relation between the frequency of unstable arc and the oxygen in the wire.

FIG. 13 shows the occurrence of the unstable arc when welding in all positions is effected for a long period of time using wire having the composition shown in Table 3.

With respect to short circuiting, the low-oxygen wires show better results if the oxygen in the wire is less as shown in FIG. 4. However, in the welding operation tests, the low-oxygen wires are difficult to use because the droplet transfer is not good in the upward welding position possibly due to the change of viscosity of the droplets. Such abnormal phenomena tend to appear when the oxygen amount adhering to the wire surface is larger than the oxygen content in the wire. Also, with a low oxygen wire, the bead takes an undesirable convex shape. From the above results, it has been revealed that the oxygen content in the wire must be not less than 0.004%.

Figure 5:
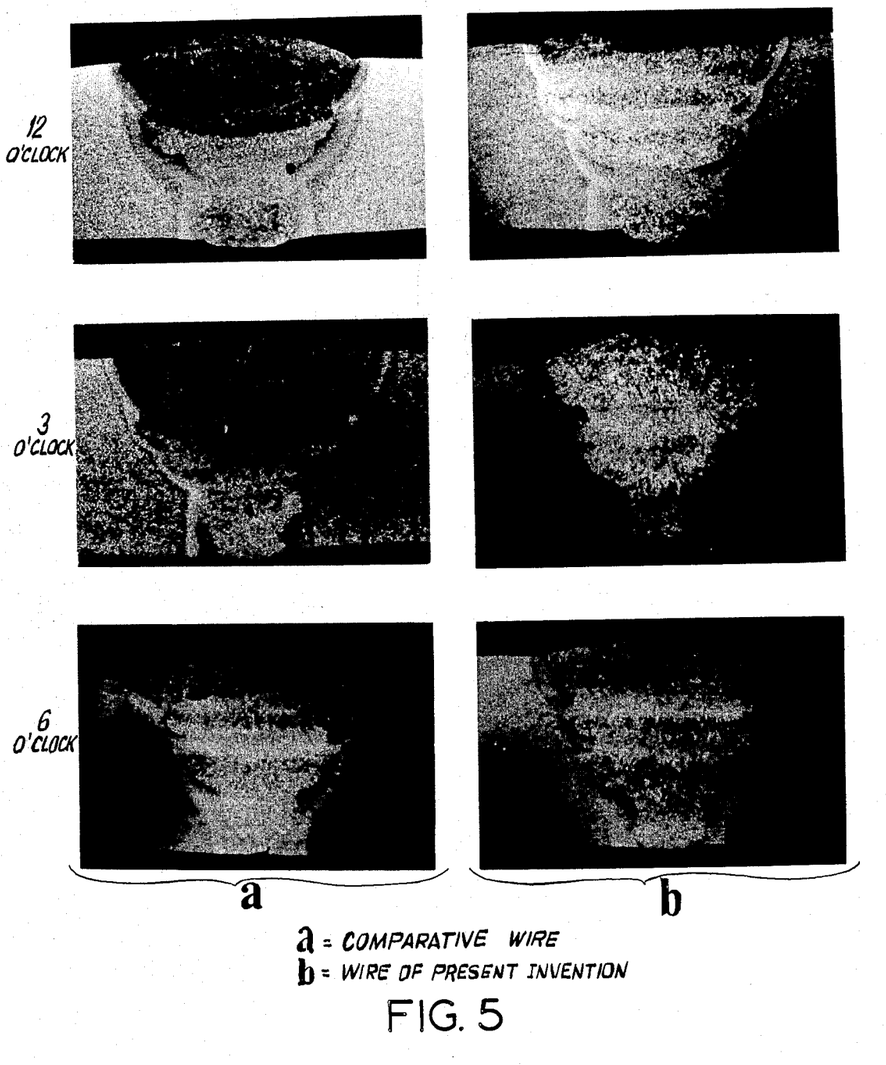
FIG. 5 is a photograph showing a macro structure of weld beads obtained by the wire of the present invention (B) and the comparative wire (A).
Figure 6:
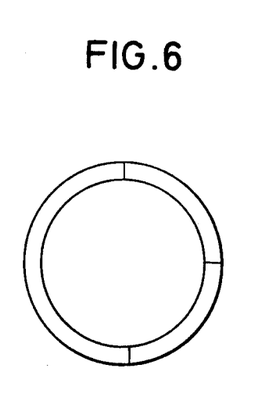
FIG. 6 shows clock positions of 12, 3 and 6 o'clock when the macro test pieces were taken after a fixed horizontal tube was welded by all-position welding.
Figure 7:
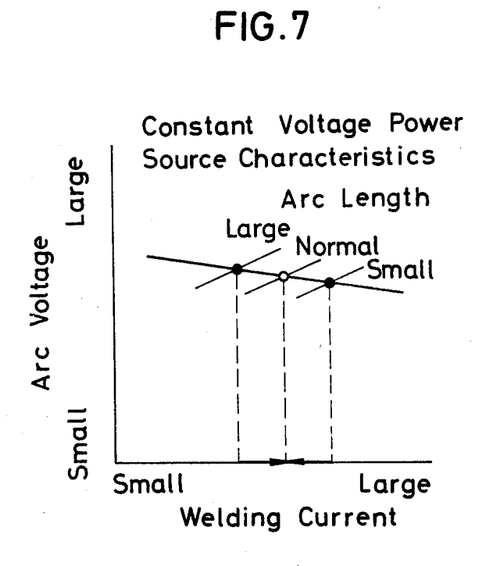
FIG. 7 is a graph showing the relation between the characteristics of a constant voltage power source and the arc characteristics.

FIG. 5 shows the results of all-position short circuiting transfer welding of a fixed horizontal tube using the wire (c) of the present invention and the comparative wire (g) shown in Table 1. The macro testpieces were taken at the clock positions of 12, 3 and 6 o'clock as shown in FIG. 6. FIG. 5(A) shows the result obtained by using the comparative wire (g) and FIG. 5(B) shows the result obtained by using the wire (c) of the present invention. The wire diameter was 1.2 mm, the tube diameter was 406.4 mm and the thickness was 12.7 mm. The base metal was STK 41 steel. The groove shape was 60° V, the root face was 0.5 mm, and the root opening was 2.0 mm. The welding was performed using a mixture gas of 75% carbonic acid gas and 25% argon gas as the shielding gas. Uranami (back) welding was applied to the first layer and four passes were applied. In each of the passes, the welding current was 80 to 150A, the voltage was 18 to 26V and the welding speed was 60 to 90 mm/min.

In this example, the base metal was thick and the welding position was changed continuously, and the welding was a multi-layer welding of four passes including back bead formaton on the first layer. Therefore, this example is very suitable for evaluating the wire of the present invention.

The wire of the present invention gives good back bead formation, a deep penetration and eliminates unsatisfactory fusion between layers and slag inclusion, and the results of X-ray transmission tests of the whole length of the wire according to the present invention were good. In contrast, the comparative wire gives bad back bead formation depending on the welding position, and can not eliminate the slag inclusion and unsatisfactory interfusion between the layers. In order to prevent these defects, various preliminary experiments and a high degree of skill are required to determine satisfactory conditions in the back bead formation, and bead surface grinding is required depending on the bead shapes because the penetration is shallow in the second layer.

The wire according to the present invention has eliminated these requirements, and satisfactory welding results can be obtained even by an unskilled operator.

The wire of the present invention can be applied to welding of a high tensile strength steel of 60–50 kg/mm² when Ni, Cr, Mo, etc., are added in a suitable amount, as well as to the welding of a high tensile strength steel of 50 kg/mm².

When short circuiting transfer welding is effected using the wire of the present invention and carbolic acid gas, argon gas, etc., the following advantages are obtained:

1. The penetration is deep, and incomplete fusion which is inherent in the short circuiting transfer and often seen in welding a thick steel plate, and slag inclusion can be eliminated, so that welding of a thick steel plate can be performed efficiently at all positions, and 2. the frequency of short circuiting is high even with a high voltage, so that a wide range of welding voltages can be used and the welding operation is very easy but yet produces remarkable industrial advantages.

Table 1

Chemical Compositions of Wires

| Wire designation | Chemical composition (%) | | | | | | | |
|---|---|---|---|---|---|---|---|---|
| | C | Si | Mn | P | S | N | $O_T$* | |
| a | 0.07 | 0.75 | 1.54 | 0.012 | 0.009 | 0.006 | 0.009 | |
| b | 0.10 | 0.73 | 1.49 | 0.011 | 0.010 | 0.007 | 0.015 | Present |
| c | 0.13 | 0.73 | 1.60 | 0.013 | 0.010 | 0.006 | 0.013 | Invention |
| d | 0.20 | 0.74 | 1.50 | 0.011 | 0.009 | 0.006 | 0.019 | |
| e | 0.04 | 0.73 | 1.48 | 0.009 | 0.008 | 0.007 | 0.010 | Com- |
| f | 0.08 | 0.74 | 1.51 | 0.009 | 0.010 | 0.006 | 0.025 | parison |
| g | 0.12 | 0.70 | 1.47 | 0.010 | 0.007 | 0.005 | 0.028 | |
| h | 0.06 | 0.76 | 1.55 | 0.012 | 0.006 | 0.007 | 0.030 | |

*$O_T$ means the total oxygen content

Table 2

Chemical Compositions of Wires

| Wire designation | Chemical composition (%) | | | | | | | | Index |
|---|---|---|---|---|---|---|---|---|---|
| | C | Si | Mn | P | S | Mo | N | O | |
| a | 0.12 | 0.81 | 1.52 | 0.028 | 0.024 | — | 0.011 | 0.027 | 3.18 |
| b | 0.13 | 0.82 | 1.50 | 0.019 | 0.016 | — | 0.010 | 0.025 | 2.56 |
| c | 0.11 | 0.76 | 1.48 | 0.016 | 0.016 | — | 0.018 | 0.023 | 1.61 |
| d | 0.12 | 0.79 | 1.45 | 0.016 | 0.016 | — | 0.013 | 0.021 | 1.18 |
| e | 0.12 | 0.75 | 1.49 | 0.013 | 0.015 | — | 0.010 | 0.020 | 0.98 |
| f | 0.10 | 0.77 | 1.51 | 0.010 | 0.009 | — | 0.008 | 0.011 | 0.51 |
| g | 0.10 | 0.89 | 1.56 | 0.009 | 0.013 | — | 0.008 | 0.018 | 0.32 |
| h | 0.11 | 0.80 | 1.48 | 0.009 | 0.005 | — | 0.008 | 0.008 | 0.13 |
| α | 0.06 | 0.74 | 1.50 | 0.016 | 0.016 | 0.41 | 0.009 | 0.022 | 1.36 |
| β | 0.05 | 0.72 | 1.49 | 0.010 | 0.008 | 0.43 | 0.008 | 0.011 | 0.71 |
| T | 0.06 | 0.72 | 1.51 | 0.009 | 0.007 | 0.40 | 0.008 | 0.009 | 0.22 |

Table 3

Chemical Compositions of Wires

| Wire Designation | Chemical Composition (%) | | | | | | | Index |
|---|---|---|---|---|---|---|---|---|
| | C | S | Mn | P | S | N | O | |
| i | 0.11 | 0.76 | 1.49 | 0.012 | 0.009 | 0.009 | 0.020 | 0.79 |
| j | 0.12 | 0.79 | 1.47 | 0.011 | 0.008 | 0.010 | 0.013 | 0.71 |
| k | 0.11 | 0.81 | 1.52 | 0.011 | 0.009 | 0.009 | 0.010 | 0.68 |
| l | 0.10 | 0.79 | 1.50 | 0.010 | 0.008 | 0.008 | 0.007 | 0.59 |
| m | 0.11 | 0.80 | 1.48 | 0.010 | 0.008 | 0.009 | 0.004 | 0.49 |
| n | 0.11 | 0.81 | 1.49 | 0.013 | 0.009 | 0.008 | 0.003 | 0.45 |
| o | 0.12 | 0.78 | 1.46 | 0.011 | 0.009 | 0.009 | 0.002 | 0.41 |

What is claimed is:

1. A steel gas shielded transfer welding wire for use under short circuiting transfer conditions consisting essentially of 0.5 to 1.0% of Si, 1.0–2.0% Mn, not more than 0.015% of P, S and N, respectively, 0.07 to 0.20% of C and not more than 0.020% of total oxygen, said total oxygen content being the sum of the oxygen within the wire plus any oxygen adhered to the surface of the wire, the amount of said oxygen within the wire being more than 0.004%, with the balance being iron, and wherein the distribution index of the number of any non-metallic inclusions in the longitudinal cross section of the wire is not higher than 1.0 as calculated by the following formula:

Distribution Index =

$$\frac{\text{Number of (inclusions [over]) between } 5\mu \text{ to } 10\mu + (\text{Number of (inclusions [over]) between } 10\mu \text{ to } 20\mu) \times 5 + (\text{Number of (inclusions) over } 20\mu) \times 10}{\text{Number of measured view fields}}$$

2. A steel wire according to claim 1 in which the oxygen content within the wire is not more than 0.010%.

3. A steel wire according to claim 1 in which the oxygen content adhered to the wire is not more than 0.010%.

* * * * *